March 11, 1969  D. W. WHITE ET AL  3,432,352
HIGH TEMPERATURE FUEL CELL HAVING A PALLADIUM FILM BETWEEN
THE ANODE AND ELECTROLYTE
Filed May 27, 1963
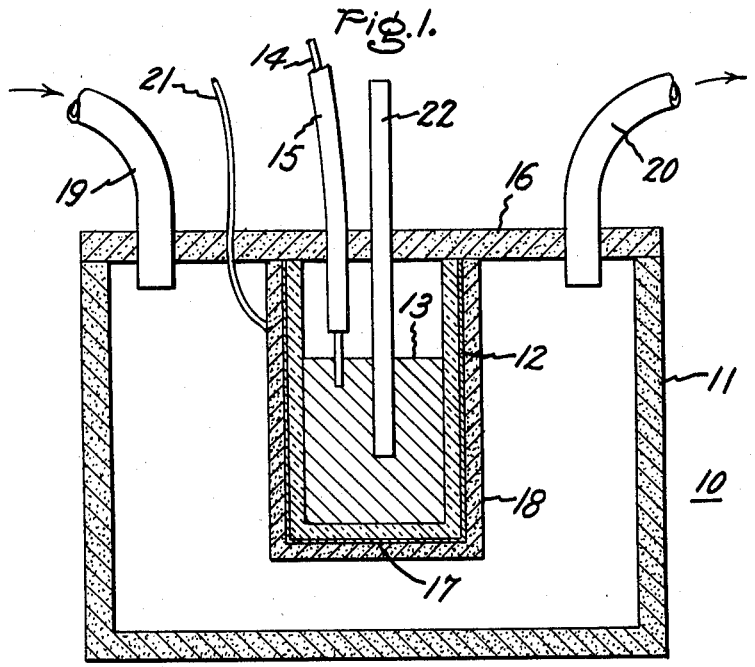
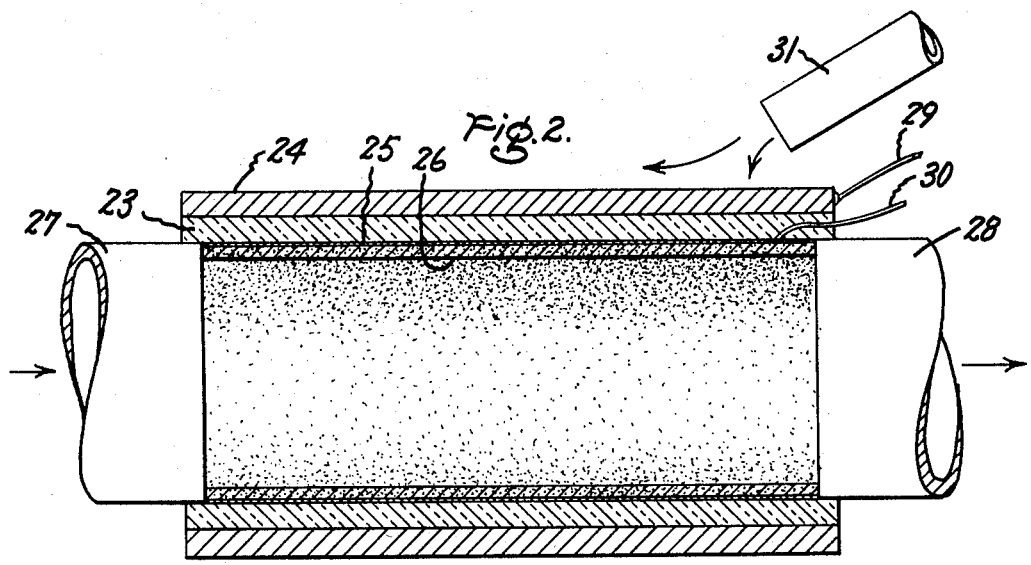
Inventors:
Donald W. White,
William E. Tragert,
William A. Rocco,
by Paul R. Webb, II
Their Attorney.

United States Patent Office 3,432,352
Patented Mar. 11, 1969

3,432,352
HIGH TEMPERATURE FUEL CELL HAVING A PALLADIUM FILM BETWEEN THE ANODE AND ELECTROLYTE
Donald W. White, Burnt Hills, and William E. Tragert and William A. Rocco, Scotia, N.Y., assignors to General Electric Company, a corporation of New York
Filed May 27, 1963, Ser. No. 283,257
U.S. Cl. 136—86  3 Claims
Int. Cl. H01m 27/06, 27/14, 27/30

This invention relates to fuel cells and more particularly to fuel cells with solid oxygen-ion electrolytes which operate at elevated temperatures.

Where electrical energy is generated from the heat of chemical reactions, a fuel is generally oxidized by air and the chemical energy of the fuel is converted into heat and mechanical energy. This heat and mechanical energy is then used in gas turbines or steam turbines connected to conventional dynamoelectric generators to provide the electrical energy needed. It is estimated that the overall efficiency of this conversion is less than 50 percent.

In order to avoid inefficiency in this type of electricity generation, it has been proposed to employ fuel cells to convert the chemical energy of the fuel directly into electrical energy without the conversion of the energy of the fuel into heat and mechanical energy. While carbon fossil fuels would be desirable in fuel cells, they are not readily brought into a form suitable for electrochemical reaction. For example, coal may poison the electrodes of a fuel cell by its chemical impurities. A further problem is the requirement for a suitable electrolyte for the successful operation of such a cell.

Fuel cells, which would operate in an elevated temperature range above 800° C. and preferably 800° C. to 1200° C., would be advantageous to provide a low voltage direct current power source on a continuous basis. Such cells should employ preferably a carbonaceous fuel, exhibit stability and efficiency and be low in cost. These cells would have application in various chemical process industries, such as the manufacture of aluminum and the electrorefining of copper. Furthermore, the operation of direct current motors could be accomplished with these cells. Waste heat can be employed effectively to operate the cells.

It is an object of our invention to provide a fuel cell which employs a carbonaceous fuel, exhibits stability and efficiency and is low in cost.

It is another object of our invention to provide a fuel cell operable at elevated temperatures, for example, in the range of 800° C. to 1200° C.

It is a further object of our invention to provide a high temperature fuel cell which includes a solid, porous carbonaceous anode.

It is a still further object of our invention to provide a high temperature fuel cell which employs a solid oxygen-ion electrolyte.

In carrying out our invention in one form, a fuel cell employs a cathode, means for supplying a gaseous oxidant containing molecular oxygen to the cathode, a solid oxygen-ion electrolyte, one surface of the electrolyte in direct contact with the cathode, a porous film of palladium on the opposite surface of the electrolyte, means for providing a solid, porous carbonaceous anode on said palladium film, and means for excluding molecular oxygen from said anode during cell operation.

These and various other objects, features, and advantages of the invention will be better understood from the following description taken in connection with the accompanying drawing in which:

FIGURE 1 is a sectional view of a high temperature fuel cell embodying our invention; and FIGURE 2 is a sectional view of a modified high temperature fuel cell.

In FIGURE 1, a high temperature fuel cell is shown generally at 10 which comprises a container 11, for example, of silica, alumina or carbon in which is positioned a second container 12 of stabilized zirconia, a solid oxygen-ion electrolyte. A cathode 13 in the form of a silver electrode is positioned in second container 12. One end of a lead 14, such as of stainless steel, is inserted in the silver electrode and the other end is connected to apparatus (not shown) being operated by the cell. Lead 14 can be encased by insulation 15. A cover 16 of the same material as the container is provided for cell 10 to exclude molecular oxygen from the anode portion of the cell during operation. A thin, porous film of palladium metal 17 is deposited on the exterior surface of container 12. A solid, porous carbonaceous anode 18 is formed on porous palladium film 17. For example, an inlet line 19 provides a hydrocarbon gas, such as methane or propane to the cell wherein the gas is thermally decomposed to carbonaceous material which is supplied to the exterior surface of container 12 as to form the solid, porous carbonaceous anode. An outlet line 20 removes any initial oxygen and subsequently the oxidation products which form during operation of the cell as well as any unconverted fuel. A nickel lead 21 contacts anode 18 by being positioned adjacent electrolyte 12 and its free end is connected to the same apparatus to complete the circuit from the cell. Thus, the carbonaceous material from inlet 19 provides the carbonaceous fuel and anode for the cell. Means are also provided in the form of tube 22 for supplying a gaseous oxidant from a source (not shown) containing molecular oxygen to silver electrode 13.

In FIGURE 2, a modified high temperature fuel cell is shown which comprises a solid oxygen-ion electrolyte 23 in the form of a hollow tubular member, and a cathode 24 in the form of a silver electrode in direct contact with the exterior surface of member 23. A thin film of palladium metal 25 is deposited on the interior surface of electrolyte 23. A solid, porous carbonaceous anode 26 is formed on paladium film 25. An inlet line 27 provides a flushing gas such as nitrogen to exclude initially molecular oxygen from the anode portion of the cell prior to operation. Inlet line 27 provides then a hydrocarbon gas, such as methane or propane from a source (not shown) to the cell wherein the gas is thermally decomposed to carbonaceous material which is supplied to the surface of film 25 to provide an anode 26. An outlet line 28 removes any initial oxygen and subsequently the oxidation products which form during operation of the cell as well as any unconverted fuel. Thus, the carbonaceous material from inlet 27 provides the carbonaceous fuel and anode for the cell. The electrodes can be reversed with the silver electrode in direct contact with the interior surface of member 23 while the carbonaceous anode is in direct contact with the palladium film 25 on the exterior surface thereof. A silver lead 29 is attached to silver electrode 24 while a nickel lead 30 contacts anode 26 by being positioned adjacent electrolyte 23. The free ends of the leads are connected to apparatus (not shown) being operated by the cell. Means are provided for supplying a gaseous oxidant containing molecular oxygen, for example, in the form of air or oxygen to silver electrode 24. For example, a tube 31 connected to an oxidant supply (not shown) supplies such an oxidant to electrode 24.

We discovered that an efficient, stable fuel cell could be constructed and operated in the temperature range of 800° C. to 1200° C. to provide a low voltage direct current power source. We found that a preferred cathode was silver to which an oxidant containing molecular oxygen was supplied during cell operation. However, other metallic oxygen solvent cathodes or metallic oxide cathodes operable at such temperature may be employed. A carbonaceous fuel from a hydrocarbon gas, a carbonaceous solid material or a carbonaceous liquid material provide a suitable anode for the cell.

We found that a nickel lead could contact the anode while a stainless steel lead encased substantially in insulation could be inserted in the silver electrode. An alumina, zirconia or stainless steel tube inserted in the silver electrode as shown in FIGURE 1 or such a tube directed toward this electrode as shown in FIGURE 2 provides the gaseous oxidant containing molecular oxygen to the silver cathode in molten state during cell operation.

The solid oxygen-ion electrolyte is an oxygen-ion transport medium which can be used effectively in such a high temperature fuel cell. "Stabilized" zirconia, which is a solid oxygen-ion electrolyte, is a compound with a cubic crystal structure consisting of zirconia to which is added calcium oxide, yttrium oxide, or mixed rare earth oxides. For example, a solid zirconia electrolyte is employed which is stabilized with 15 molecular percent calcium oxide. Other stabilized zirconia, which are also employed are discussed in "Oxide Ceramics" by Ryshkewitch, Academic Press, 1960, particularly on pp. 354, 364 and 376 thereof.

Substantially pure zirconia, that is a compound with a monoclinic structure which is not "stabilized" by the addition of the above oxides, experiences volume changes when cycled thermally with resultant shattering of the material. Furthermore, substantially pure zirconia is an electronic conductor. "Stabilized" zirconia is resistant to large volume changes upon thermally cycling and hence is mechanically stable. Additionally, "stabilized" zirconia serves as an oxygen-ion transport medium by virtue of the anion vacancies generated in the zirconia structure upon cationic substitution of calcium for zirconium. Each substitution of a divalent calcium ion for a tetravalent zirconium ion results in a charge unbalance in the crystal that is redressed by the absence of a divalent oxygen ion from a normally occupied anion site in the lattice.

The concentration of vacancies is thus equal to the concentration of calcium ions in the zirconia. Since the movement of an oxygen-ion vacancy through the lattice is the converse of an oxygen-ion movement in the opposite direction, a relatively high degree of oxygen mobility can be realized at fuel cell operating temperatures where the ion vacancy interchange occurs readily. A flux of oxygen through the stabilized zirconia lattice is affected by the establishment of an electric field resulting from the chemical potential difference for oxygen existing across the crystal. The resultant relatively good conductivity coupled with chemical stability and strength of the stabilized zirconia provides a very satisfactory electrolyte for high temperature fuel cells.

We discovered that a very thin, porous film of palladium on the electrolyte acts as a catalyst to decompose the carbonaceous material more rapidly to an anode structure. Such a porous film which has a thickness, for example, of 1 micron produces this expectedly catalytic effect. With the rapid decomposition at the porous film surface, a reduced flow rate can be employed for the carbonaceous material. We found expectedly that such a porous palladium film lowered also the operable cell temperature to a range of 800° C. to 850° C. While the beneficial catalytic effect of film occurs at temperatures of 1000° C. to 1200° C., this effect is also present in a temperature range of 800° C. to 1200° C. Such a high temperature fuel cell with a porous palladium film provides a higher current density because of an improved anode structure.

In the operation of fuel cell 10 in FIGURE 1, heat, such as waste heat, is supplied from a source (not shown) to raise the temperature of electrodes 13 and 14 of cell 10 in the range of 1000° C. to 1200° C. The molten silver cathode is then saturated with oxygen by bubbling air or oxygen through tube 18 into liquid electrode 14. Anode 18 is formed from carbonaceous material supplied from a hydrocarbon gas through inlet 19. The reactions at the cathode-electrolyte interface is as follows:

(1) 

$$O + 2e \rightarrow O^=$$

The oxygen ion moves through electrolyte 12 to combine with carbon in accordance with the following reaction at anode-electrolyte interface:

(2) 

$$C + O^= \rightarrow CO + 2e$$

The electrons, which are given up at the anode, are conducted through lead 21 to the apparatus (not shown) being operated while the oxygen at the cathode combines with the returning electrons. The carbon monoxide which is generated at the anode is released through outlet 20 to the atmosphere, used to provide further heat for cell 10, or fed to a fuel cell employing carbon monoxide as a fuel. The cell of FIGURE 2 operates in the same manner as cell 10 in FIGURE 1 except that a tube 31 supplies a gaseous oxidant containing molecular oxygen to liquid silver electrode 24 during cell operation.

Several examples of fuel cells which are in accordance with the present invention are as follows:

EXAMPLE I

A fuel cell was set up in accordance with FIGURE 1 of the drawing including a silica container into which was positioned a second container of zirconia stabilized with 11 molecular percent calcium oxide. A silver cathode was positioned in the second container and connected by a lead to a simple decade resistor. A cover of stainless steel was provided for the cell to exclude molecular oxygen from the anode portion of the cell during operation. A one micron thick film of palladium was deposited on the exterior surface of the second container. A nickel lead, which was connected to the above decade resistor, had its opposite end positioned against the palladium film. Inlet and outlet lines were provided to the anode portion of the cell. Nitrogen gas was initially flowed through the outlet line to the chamber between the first and second containers, the anode portion of the cell, to exclude molecualr oxygen from this portion of the cell prior to and at the beginning of the cell operation. A fuel mixture of 20 volume percent natural gas and 80 volume percent hydrogen was introduced through the inlet line to the anode portion of the cell. The cell was heated to a temperature of 1010° C. in a resistance furnace. Carbonaceous material from the hydrocarbon gas was deposited as the cell anode on the exterior surface of the second container with the film of palladium thereon. Carbon monoxide and hydrogen were released from the anode portion through the outlet line. The deposited anode was in contact with the lead which was positioned adjacent the palladium film. The silver cathode, which was molten at the above temperature, was saturated with oxygen by bubbling oxygen through a tube into the molten silver. The gas mixture was flowed into the anode portion at a rate of 200 cubic centimeters per minute. At a load voltage of 0.7 volt, a current density of 160 milliamperes per square centimeter was exhibited. This cell was operated for a period of about 180 hours.

EXAMPLE II

A fuel cell was set up and operated in the manner set forth in Example I except for the following changes. Natural gas was flowed into the anode portion at a rate of 60 cubic centimeters per minute. The cell was heated to a temperature of 1010° C. At a load voltage of 0.7 volt, the cell exhibited a current density of 160 milliamperes per square centimeter. This cell was operated for a period of 100 hours.

EXAMPLE III

A fuel cell was set up and operated as set forth in above Example I. However, this cell which employed a fuel gas mixture of 30 volume percent natural and 70 volume percent hydrogen, was operated at a temperature of 930° C. The fuel gas was flowed through the anode portion at a rate of 200 cubic centimeters per minute. At a load voltage of 0.7 volt, the cell exhibited a current density of 24 milliamperes per square centimeter. This cell was operated for a period of four hours.

While other modifications of this invention and variations thereof which may be employed within the scope of the invention have not been described, the invention is intended to include such that may be embraced within the following claims.

What we claim as new and desire to secure by Letters Patent of the United States is:

1. In a fuel cell comprising an electrically conductive cathode and a porous carbon anode separated by a solid oxygen-ion electrolyte, said electrode being used in a high temperature fuel cell, wherein at temperatures over about 800° C. direct current is generated by supplying a gaseous oxidant containing molecular oxygen at the cathode and removing combustion products from the anode, the improvement comprising a porous film of palladium metal interposed between and in contact with the solid oxygen-ion electrolyte and the porous carbon anode.

2. The improvement substantially as recited in claim 1 wherein the solid oxygen-ion electrolyte is stabilized zirconia.

3. The improvement substantially as recited in claim 1 wherein the palladium film employed is about 1 micron in thickness.

References Cited

UNITED STATES PATENTS

| | | | |
|---|---|---|---|
| 3,077,508 | 2/1963 | Oswin | 136—121 |
| 3,138,487 | 4/1966 | Tragert | 136—86 |
| 3,244,564 | 4/1966 | Fox | 136—86 |

WINSTON A. DOUGLAS, *Primary Examiner.*

H. FEELEY, *Assistant Examiner.*